United States Patent

[11] 3,627,855

| [72] | Inventors | Otto Schott<br>Mannheim;<br>Klaus Bronstert, Carlsberg/Upper Palatinate; Adolf Echte; Juergen Hofmann; Dieter Stein, all of Ludwigshafen am Rhine, all of Germany |
|---|---|---|
| [21] | Appl. No. | 665,237 |
| [22] | Filed | Sept. 5, 1967 |
| [45] | Patented | Dec. 14, 1961 |
| [73] | Assignee | Badische Anilin- & Soda-Fabrik Aktiengesellschaft<br>Ludwigshafen am Rhine, Germany |
| [32] | Priority | Sept. 10, 1966 |
| [33] | | Germany |
| [31] | | P 15 95 343.2 |

[54] PRODUCTION OF IMPACT-RESISTANT STYRENE COPOLYMERS
2 Claims, No Drawings

[52] U.S. Cl. .................................................. 260/880 R, 260/93.5 W
[51] Int. Cl. ..................................................... C08f 15/04, C08f 1/04, C08f 1/11

[50] Field of Search ........................................... 260/880

[56] References Cited
UNITED STATES PATENTS

| 3,515,774 | 6/1970 | Lee .............................. | 260/880 |
| 3,238,275 | 3/1966 | Calvert ........................ | 260/880 |
| 3,288,886 | 11/1966 | Himei et al. ................ | 260/880 |
| 3,288,887 | 11/1966 | Yoshino et al. ............. | 260/880 |
| 3,448,175 | 6/1969 | Doak et al. ................... | 260/880 |

FOREIGN PATENTS

| 979,652 | 1/1965 | Great Britain ............... | 260/880 |

Primary Examiner—James A. Seidleck
Attorney—Johnston, Root, O'Keefe, Keil, Thompson & Shurtleff ABSTRACT: Production of impact-resistant styrene copolymers by polymerizing styrene and acrylonitrile in the presence of butadiene polymers, the bulk of the acrylonitrile being added to the system after a disperse phase has formed from the homogeneous rubber monomers.

PRODUCTION OF IMPACT-RESISTANT STYRENE COPOLYMERS

This invention relates to a process for the production of impact-resistant styrene copolymers in which styrene and acrylonitrile are polymerized in the presence of butadiene polymers.

It is known that impact-resistant materials can be prepared from (a) an elastomeric graft copolymer of butadiene with styrene and acrylonitrile and (b) a copolymer of styrene and acrylonitrile by emulsion polymerization. Such products have a high gloss and good mechanical properties when they have fairly large rubber contents of about 20 percent. They are difficult to process however and their production is expensive as compared with suspension, solution or bulk polymerization methods. Furthermore it is known that impact-resistant materials having high acrylonitrile contents with comparable mechanical characteristics can be prepared by suspension, solution or bulk polymerization methods, but these have less smooth and homogeneous surfaces, poorer gloss and unfavorable flow properties.

We have now found that while avoiding the above-mentioned disadvantages, impact-resistant styrene copolymers can be prepared by polymerizing styrene and acrylonitrile in the presence of elastomeric homopolymers and/or copolymers of butadiene by methods known per se by withholding the addition of at least 40 percent by weight of the acrylonitrile used for the polymerization until after the homogeneous rubber monomer phase forms a disperse phase. Up to 100 percent of the required amount of acrylonitrile may be added in this way.

Impact-resistant styrene polymers which have a homogeneous smooth surface, high gloss and outstanding mechanical and processing properties are obtained. Moreover the impact-resistant acrylonitrilestyrene polymers can be prepared much more simply according to this invention because during production according to this invention the viscosity of the reaction mixture is lower and therefore the materials may be readily mixed.

The impact-resistant styrene polymers are advantageously prepared according to the invention by suspension, solution or bulk polymerization.

Thus for example suspension polymerization may be carried out by dissolving rubber in styrene, with or without the addition of conventional lubricants, such as butyl stearate and/or aliphatic hydrocarbons, technical-grade liquid petrolatum and aging retardants, such as di-tert-butyl-p-cresol, and in the presence of 0 to 60 percent by weight of the acrylonitrile used for the polymerization. This solution is advantageously polymerized (continuously or batchwise) thermally or in the presence of conventional catalysts up to a solids content of 25 to 35 percent. Then the remainder of the acrylonitrile is mixed in. If desired conventional polymerization catalysts may be added at this stage and the polymerization mixture may be suspended in water by means of high molecular weight watersoluble protective colloids such as polyvinylpyrrolidone or inorganic pigments, such as hydroxylapatite. Polymerization of the suspension is carried to completion at a temperature of from 80° to 140° C.

Solution polymerization may be carried out for example by first dissolving rubber in styrene with or without adding conventional lubricants, such as butyl stearate and/or aliphatic hydrocarbons, technical-grade liquid petrolatum and aging retardants, such as di-tert-butyl-p-cresol, and in the presence of 0 to 60 percent by weight of the acrylonitrile to be used for the polymerization ad adding to this solution up to 30 percent by weight (based on the monomers) of a solvent, for example ethylbenzene or toluene. This solution is polymerized up to a solids content of 15 to 40 percent, if desired in the presence of conventional catalysts. Then the remainder of the amount of acrylonitrile required for the polymerization is metered in and the polymerization carried to its end. By otherwise the same method (but in the absence of a solvent) bulk polymers are obtained.

In all cases polymerization is started with a homogeneous solution rubber in a mixture of monomers. In the course of the polymerization a second phase forms which consists of a solution of stryene/acrylonitrile copolymer in dissolved monomers, the amount of the second phase continually increasing at the expense of the rubber/monomer phase. When the amounts of the two phases are about the same, phase inversion takes place in that the rubber/monomer phase (which up till then had been continuous) breaks up and becomes the disperse phase, while the disperse phase of copolymer in the monomers becomes the continuous phase. It is only after phase inversion has taken place that the remainder of the acrylonitrile required for the polymerization is added.

The styrene and acrylonitrile used for polymerization are prepared by conventional methods. Homopolymers and copolymers of butadiene in accordance with this invention are polymers which are soluble in the above-mentioned monomers without gel formation ad which have been prepared in the usual way by emulsion or solution polymerization; they advantageously contain not more than 25 percent of styrene. The molecular weight of these polymers is from 175,000 to 350,000. the intrinsic viscosity is from 1.7 to 2.8 and the Moony viscosity (ML-4',100° C.) is from 25 to 65.

The impact-resistant styrene copolymers obtained according to the invention are suitable for making moldings, for example battery containers and radio cabinets.

The invention is further illustrated by the following examples in which parts and percentages are by weight.

Examples 1 to 6 illustrate the present invention as applied to suspension polymerization. The softening component in examples 1 to 3 is a polybutadiene prepared with n-butyl lithium. The Mooney viscosity (ML-4', 100° C.) is 37.5. the Defo hardness is 425, the Defo elasticity is 4 (both measured at 30° C.) and the 1,2-vinyl fraction is 9 percent. This rubber dissolves in aromatic solvents without any gel formation.

EXAMPLE 1

A solution is prepared by dissolving 9 parts of polybutadiene, 0.2 part of di-tert-butyl-p-cresol as an aging retardant, 0.4 part of butyl stearate as a lubricant, 10 parts of acrylonitrile and 80.4 parts of styrene. This solution is continuously polymerized up to a solids content of 33 percent in three stirred vessels arranged in series, the first two being pressure reactors. The throughput and the dimensions of the three reactors are correlated so that the following residence times and temperature spectrum result:

| reactor 1: | 1.5 hours | 100° C. |
| reactor 2: | 2 hours | 95° C. |
| reactor 3: | 1.75 hours | 105° C. |

85 parts of this polymer prepared continuously by thermal polymerization is mixed with 15 parts of acrylonitrile and then 0.32 percent of benzoyl peroxide, dissolved in a little styrene, is added to the reaction mixture. To 150 parts of this mixture there is then added with intense stirring 200 parts of aqueous phase containing 0.2 percent of polyvinylpyrrolidone (LU-VISKOL K 90) and 0.1 percent of sodium pyrophosphate (Na$_4$P$_2$O). Polymerization is then continued for another 10 hours at 80° C. and for 10 hours at 95° C. The beads obtained are isolated, washed, dried and processed into test specimens (for results, see table 1).

EXAMPLE 2

First comparative example to example 1

The original solution consists of 9 parts of polybutadiene, 0.2 part of aging retardant, 0.4 part of lubricant and also 25 parts of acrylonitrile and 65.4 parts of styrene. Polymerization is carried out as in example 1 but at the following temperature:

| reactor 1: | 93° C. |
| reactor 2: | 91° C. |
| reactor 3: | 100° C. |

The solids content corresponded to that of example 1. All other conditions are the same as in example 1, except that there is no further addition of acrylonitrile. The test data are given in table 1.

EXAMPLE 3

Second comparative example to example 1

The starting solution does not contain any acrylonitrile, this being added (25 percent of the organic phase) to the prepolymer prior to addition of the catalyst. Otherwise the conditions are the same as in example 1. Test results are given in table 1.

TABLE 1.—Test data of impact-resistant polystyrenes from Examples 1 to 3

| Example | 1 | 2 | 3 |
|---|---|---|---|
| Tensile strength, kg./sq. cm. (DIN 53,455) | 367 | 338 | 364 |
| Elongation, percent (DIN 53,455) | 15.5 | 6 | 5 |
| Impact strength (notched), cm. kg./sq. cm. (DIN 53,453) | 18 | 12 | 10 |
| Appearance of moldings prepared by injection molding | (1) | (2) | (1) |
| Melt index, g./5 minutes | 0.9 | 0.3 | 0.5 |
| Flow behavior of the polymer melt; processability | (3) | (4) | (3) |
| Resistance to gasoline | (5) | (3) | (5) |

[1] Glossy surface, good gloss.
[2] Mat surface, poor gloss.
[3] Good.
[4] Poor.
[5] Outstanding.

The data collected in the table clearly show the advantage of the process according to this invention over the prior art methods. The high elongation gives greater safety against breakage of the finished products which is enhanced by their special toughness. The surface is completely homogeneous and has high gloss. In this last-mentioned property and also in flow behavior (but not in impact strength) the product set out under example 3 is also satisfactory.

When using the above-mentioned lithium polybutadiene, the process according to the invention according to example 1 produces an unexpectedly good combination of properties in impact-resistant polystyrene.

For the following examples 4 and 5, a so-called hot rubber is used which contains 23.5 percent of styrene. The Mooney viscosity (ML-4', 100° C.) is 45, the Defo hardness is 1,200 (at 30° C.) and 500 (at 80° C.) and the elastic content is 35 (at 30° C.) and 32 (at 80° C.).

EXAMPLE 4

Ninety parts of the said hot rubber is dissolved in 1,150 parts of styrene and 75 parts of acrylonitrile, 1.5 parts of tert-dodecylmercaptan is added and then the whole is polymerized for 6 hours at 108° C. in a pressure vessel fitted with stirring means and a reflux condenser. Then 0.75 part of di-tert-butyl peroxide and 180 g. of acrylonitrile are added, the whole is stirred thoroughly, 3,000 parts of aqueous phase is added and polymerization is completed. The aqueous phase is a solution of 15.45 parts of trisodium phosphate, 23 parts of calcium chloride, 10.25 parts of 10 percent ammonium hydroxide and 35 parts of sodium dodecylbenzenesulfonate in 3,000 parts of water.

The aqueous suspension is polymerized for 5 hours at 120° C., 3 hours at 125° C. and 6 hours at 140° C. at a pressure of 4 to 5 atmospheres gauge which is set up with nitrogen. The results of the experiment are given in table 2.

EXAMPLE 5

First comparative example to example 4

The same mixture is used as in example 4 but the whole of the acrylonitrile is added at the start and the temperature during the prepolymerization (in bulk) is lowered to 97° C. Results are shown in table 2.

EXAMPLE 6

Second comparative example to example 4

In an analogous manner to example 3, the whole of the acrylonitrile is added immediately prior to the addition of the aqueous phase. The data collected in table 2 are determined on standard test specimens.

TABLE 2.—Test data of impact-resistant polystyrenes from Examples 4 to 6

| Example | 4 | 5 | 6 |
|---|---|---|---|
| Tensile strength, kg./sq. cm. (DIN 53,455) | 360 | 305 | 375 |
| Elongation, percent (DIN 53,455) | 29 | 15 | 19.5 |
| Impact strength (notched) (DIN 53,453) | 7.8 | 6.4 | 5.8 |
| Melt index, g./5 minutes | 0.9 | 0.3 | 0.6 |
| Appearance of moldings prepared by injection molding | (1) | (2) | (1) |
| Flow behavior | (3) | (4) | (3) |

[1] Glossy.  [2] Mat.  [3] Good.  [4] Poor.

The impact-resistant product prepared according to the invention (example 4) again has the best strength properties.

EXAMPLE 7

The production of molding material according to the invention by the solution method may be carried out as follows:

A solution prepared from 5.7 parts of polybutadiene (Mooney viscosity (ML-4', 100° C.) 38, Defo hardness 410, Defo elasticity 4, 1,2-vinyl fraction 10 percent), 97 parts of styrene, 4 parts of acrylonitrile and 0.03 part of di-tert-butyl-p-cresol as aging retardant, and 8 parts of ethylbenzene as solvent is continuously polymerized to a solids content of 80 percent in a five-part apparatus consisting of three vessels and two towers. The solution is freed from residual monomers and solvent at 230° C. in vacuo. The polymerization conditions are as follows:

Vessel 1: temperature 102° C., residence time 1.5 hours, solids content 6 percent (the rubber phase is the continuous phase);

vessel 2: temperature 109° C., residence time 2.5 hours, solids content 24 percent (the rubber phase is the disperse phase);

vessel 3: in accordance with the invention another 13 parts of acrylonitrile is pumped into the solution. The vessel is kept at 95° C. and a residence time of 2.5 hours at a solids content of 30 percent is maintained.

The pressure in all three reactors is 5 atmospheres gauge. Further polymerization takes place in two towers provided with stirrers with a uniform rise in temperature from 95° to 140° C. up to a solids content of 80 percent with a residence time of 5 hours. The solution obtained is freed from residual monomers and solvent in vacuo and 1 percent of butyl stearate is incorporated. An impact-resistant molding material is obtained having the following properties:

| | |
|---|---|
| tensile strength | 280 kg./sq.cm. |
| elongation | 32% DIN 53,455 |
| impact strength (notched) | 9 kg.cm./sq.cm. DIN 53,453 |
| melt index | 1 g./5 minutes |
| surface | 0.35 micron |
| Vicat number | 88 |
| gel content | 18% |

EXAMPLE 8

When the amount of acrylonitrile required for polymerization in accordance with this invention is not subdivided and a solution of 5.7 parts of polybutadiene in 95 parts of styrene, 17 parts of acrylonitrile, 0.03 part of di-tert-butyl-p-cresol, and 8 parts of ethylbenzene is polymerized in the same way as in example 7, the following values are measured on the end product lubricated with 1 percent of butyl stearate:

| | |
|---|---|
| tensile strength | 350 kg./sq.cm. |
| elongation | 15% |
| impact strength (notched) | 6 kg.cm./sq.cm. |
| melt index | 0.6 g./5 minutes |
| surface | 0.4 micron |
| Vicat number | 88 |
| gel content | 14% |

It will be seen that the subdivision of the acrylonitrile required for polymerization in accordance with this invention results in a considerable improvement in the mechanical properties. The resistance to gasoline is good in both cases.

In examples 9 and 10 a rubber prepared by means of an organolithium catalyst in solution with 25 percent of styrene is used. To distinguish it from conventional hot rubber or SBR-types, this type of rubber is known as stereo-SBR. The Mooney viscosity (ML-4', 100° C.) is 57, the Defo hardness is 3,000 (at 30° C.) and 800 (at 80° C.), the elastic fraction is 32 (30° C.) and 27 (80° C.). The distribution of isomers of the butadiene fraction is 27 to 30 percent of 1,2-vinyl and 73 to 70 percent of 1,4.

The apparatus used for the production of the impact-resistant polystyrene consists of five reactors equipped with stirrers. Reactors 1 and 2 are provided with reflux condensers. Reactors 3, 4 and 5 are pressure tight.

EXAMPLE 9

Eight parts of stereo-SBR rubber is dissolved in 76 parts of styrene and then 10 parts of isopropylene and 5 parts of acrylonitrile and 1 part of di-n-butyl phthalate (as a lubricant) are added. This solution is supplied to the first reactor and polymerized for 1.5 hours at 102° C. The mixture of resultant polymer, unreacted monomers, solvent and lubricant is continuously supplied to the second reactor where it is further polymerized for 1.5 hours at 97° C. During the polymerization, acrylonitrile is added to the mixture in the second reactor in such an amount that its total concentration is 10.2 percent. On leaving reactor 2, the polymer solution contains 57. Eight percent of the acrylonitrile used for the production of the impact-resistant product. The mixture supplied to reactor 3 is polymerized for 1.5 hours at 113° C. At the same time, such an amount of acrylonitrile is continuously metered in at this stage that its content in the discharge from reactor 3 is 17.65 percent of the polymer solution.

The residence time in reactors 4 and 5 is 3 hours in each case and the corresponding temperatures are 121° C. and 126° C. The mixture is then devolatilized in an extruder and processed into test specimens. The test data are given in table 3.

EXAMPLE 10

Comparative example to example 9

The whole of the acrylonitrile is added to the mixture at the start. Otherwise the experimental conditions are the same as in example 7. The results are given in table 3.

In examples 11 and 12, the rubber used is a polybutadiene prepared by means of a Ziegler catalyst. The Mooney viscosity (ML-4', 100° C.) is 40, the Defo hardness is 1,070 (at 30° C.) and 820 (at 80° C.) and the corresponding elasticity values are 37 (at 30° C.) and 28 (at 80° C.).

EXAMPLE 11

Apart from the type of rubber used, the conditions are the same as in example 9. Experimental results are shown in table 3.

EXAMPLE 12

Comparative example to example 11

The whole of the acrylonitrile is dissolved in the mixture at the start, but otherwise the procedure of example 11 is followed. Test data are given in table 3.

TABLE 3

| Example | 9 | 10 | 11 | 12 |
|---|---|---|---|---|
| Tensile strength, kg./sq. cm. (DIN 53,455) | 380 | 480 | 280 | 285 |
| Elongation, percent (DIN 53,455) | 14 | 1 | 21 | 8 |
| Impact strength (notched), kg. cm./sq. cm. (DIN 53,453) | 8.4 | 7.1 | 7.8 | 6.8 |
| Melt index g./5 minutes | 1.5 | 0.3 | 1.0 | 0.35 |

The impact-resistant compositions (9 and 11) again show as compared with the comparative samples (10 and 12) unexpectedly high elongations and toughness properties together with good surface and processing properties.

We claim:

1. In a process for the production of impact-resistant styrene copolymers by polymerizing styrene and acrylonitrile in the presence of homopolymers of butadiene or copolymers of butadiene and styrene initially by solution or bulk polymerization, the improvement which comprises: dissolving the butadiene homopolymer or copolymer in styrene along with from about 23.5 to 60 percent by weight of the acrylonitrile to be used in the polymerization and adding the balance of the acrylonitrile to be used in the polymerization after the rubber/monomer phase, which up till then had been continuous, breaks up and becomes the disperse phase, while the disperse phase of copolymer in the monomers becomes the continuous phase, and thereafter completing the polymerization in bulk or solution.

2. In a process for the production of impact-resistant styrene copolymers by polymerizing styrene and acrylonitrile in the presence of homopolymers of butadiene or copolymers of butadiene and styrene initially by solution or bulk polymerization, the improvement which comprises: dissolving the butadiene homopolymer or copolymer in styrene along with from about 23.5 to 60 percent by weight of the acrylonitrile to be used in the polymerization and adding the balance of the acrylonitrile to be used in the polymerization after the rubber/monomer phase, which up till then had been continuous, breaks up and becomes the disperse phase, while the disperse phase of copolymer in the monomers becomes the continuous phase, suspending the polymerization mixture in water, and carrying the polymerization of the resultant suspension to completion at a temperature of from 80° to 140° C.

* * * * *

PO-1050
(5/69)

UNITED STATES PATENT OFFICE
CERTIFICATE OF CORRECTION

Patent No. 3,627,855        Dated December 14, 1971

Inventor(s) Otto Schott et al

It is certified that error appears in the above-identified patent and that said Letters Patent are hereby corrected as shown below:

First page, left-hand column, ninth line, "Dec. 14, 1961" should read -- Dec. 14, 1971 --.

Column 1, line 65, "ad" should read -- and --.

Column 2, line 16, "ad" should read -- and --; line 21, "Moony" should read -- Mooney --; line 59, "($Na_2P_2O$)" should read -- ($Na_2P_2O_7$) --; line 70, "temperature" should read -- temperatures --.

Signed and sealed this 30th day of May 1972.

(SEAL)
Attest:

EDWARD M. FLETCHER, JR.
Attesting Officer

ROBERT GOTTSCHALK
Commissioner of Patents